(12) United States Patent
Extra et al.

(10) Patent No.: US 10,712,724 B2
(45) Date of Patent: Jul. 14, 2020

(54) FAILSAFE AUTOMATION SYSTEM

(71) Applicant: Siemens Aktiengesellschaft, Munich (DE)

(72) Inventors: Johannes Extra, Erlangen (DE); Hermann Jartyn, Igensdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/637,803

(22) Filed: Jun. 29, 2017

(65) Prior Publication Data
US 2018/0011470 A1 Jan. 11, 2018

(30) Foreign Application Priority Data
Jul. 5, 2016 (EP) .................................... 16177938

(51) Int. Cl.
*G05B 19/05* (2006.01)
*G05B 19/042* (2006.01)
(52) U.S. Cl.
CPC ....... *G05B 19/058* (2013.01); *G05B 19/0428* (2013.01); *G05B 2219/14007* (2013.01)
(58) Field of Classification Search
CPC ..................... G05B 19/058; G05B 19/0428
USPC ......................................................... 700/79
See application file for complete search history.

(56) References Cited

U.S. PATENT DOCUMENTS

| | | | |
|---|---|---|---|
| 2002/0046397 A1* | 4/2002 | Schmitt | G05B 19/056 717/125 |
| 2005/0041613 A1* | 2/2005 | Kuhl | H04L 29/06027 370/320 |
| 2005/0160412 A1* | 7/2005 | Thurner | G06F 8/24 717/148 |
| 2006/0224811 A1* | 10/2006 | Sichner | G05B 19/0428 710/306 |

(Continued)

FOREIGN PATENT DOCUMENTS

| | | |
|---|---|---|
| CN | 105247268 | 1/2016 |
| DE | 102007028390 | 12/2008 |

(Continued)

OTHER PUBLICATIONS

Bluetooth SIG, Inc. Bluetooth Specification 4.1 (rev 2013), p. 85, 2013; Retrieved from http://www.bluetooth.com/specifications/archived-specifications/ on Aug. 18, 2019 (Year: 2013).*

(Continued)

*Primary Examiner* — Mohammad Ali
*Assistant Examiner* — Joshua T Sanders
(74) *Attorney, Agent, or Firm* — Cozen O'Connor

(57) ABSTRACT

An input system and failsafe automation system, wherein the failsafe automation system includes a motion controller connected to multiple failsafe processors that are each respectively associated with a safety level, and wherein the motion controller includes at least one associated drive, where the respective drive is respectively associated with areas and each respective area has an associated safety level that indicates the level of (fail)safety level with which the (Continued)

respective area needs to be established such that the failsafe automation system allows individual areas in spaces such as production halls to be easily equipped with the necessary (fail)safety level.

11 Claims, 3 Drawing Sheets

(56) References Cited

U.S. PATENT DOCUMENTS

| | | | | |
|---|---|---|---|---|
| 2010/0179690 | A1* | 7/2010 | Matthias | B25J 9/1676 |
| | | | | 700/253 |
| 2011/0298579 | A1* | 12/2011 | Hardegger | F16P 3/14 |
| | | | | 340/3.1 |
| 2012/0296446 | A1* | 11/2012 | Neupartl | G05B 19/0428 |
| | | | | 700/1 |
| 2014/0239923 | A1* | 8/2014 | Alley | G05B 9/03 |
| | | | | 323/234 |
| 2016/0040827 | A1 | 2/2016 | Merx | |
| 2016/0216704 | A1* | 7/2016 | Koh | G05B 19/0425 |
| 2016/0313719 | A1 | 10/2016 | Sugiyama et al. | |

FOREIGN PATENT DOCUMENTS

| | | |
|---|---|---|
| DE | 102009054157 | 4/2011 |
| EP | 1703346 | 9/2006 |
| EP | 2192461 | 6/2010 |
| EP | 2395274 | 12/2011 |
| WO | WO 2015/162760 | 10/2015 |

OTHER PUBLICATIONS

European Search Report dated Dec. 22, 2016 which issued in the corresponding European application No. 16177938.

Office Action dated Jul. 1, 2019 issued in Chinese Patent Application No. 201710525165.4.

* cited by examiner

FAILSAFE AUTOMATION SYSTEM

BACKGROUND OF THE INVENTION

1. Field of the Invention

The invention relates to a failsafe automation system, an input system for the failsafe automation system and an installation.

2. Description of the Related Art

Failsafe automation systems are used to control and/or regulate drives in safety-relevant areas, such as an industrial installation. To increase safety, automation systems involve, by way of example, safe input methods being used, individual elements of the automation system being embodied redundantly (i.e., repeatedly) and/or the transmission of signals between the individual elements being configured safely.

In this regard, EP 2 192 461 A1 describes a control apparatus and a system for failsafe data transmission.

In installations, particularly production machines, there are areas in which parts of the installation require different standards for failsafety.

SUMMARY OF THE INVENTION

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

It is an object of the invention to provide an automation system that is flexibly adaptable to suit different safety requirements.

This and other objects and advantages are achieved in accordance with the invention by a failsafe automation system, where the failsafe automation system includes a motion controller and at least one failsafe processor. The failsafe automation system optionally has drives. The failsafe automation system is used to control and/or regulate a plurality of drives. The drives are controlled and/or regulated by preferably using the motion controller. The drives are respectively associated with an area, where the respective area has a respective assigned safety level and where the areas are respectively arranged adjacently, particularly physically adjacently, to one another.

The failsafe processor may be formed as a separate hardware component. The failsafe processor may similarly be integrated in the motion controller and/or in the drive. The failsafe processor is preferably formed as a software block or as an additional computer program.

An automation system is understood to mean at least part of a drive system. The automation system advantageously has components, such as a motion controller, particularly a programmable logic controller (PLC) and, if needed processors, such as switching elements or network adapters (proxies, hosts) and optionally drives. The drives respectively have a converter and a motor. A failsafe automation system advantageously has a failsafe motion controller and/or failsafe processors, where the failsafe processors check, by way of example, the transmission of signals from the motion controller to the drives. An automation system advantageously has a data connection for transmitting data and/or signals.

The installation is particularly in the form of a production machine, machine tool or industrial installation, where the installation has a failsafe automation system as described here.

The drives are advantageously connected to the motion controller. The drives have a converter or a frequency converter and an electric machine, particularly an (electric) motor. In line with the safety level, a drive comprises a brake and/or a transmitter, if needed. The brake is preferably used to more quickly slow down the drive and/or to ensure the drive is at a standstill. Advantageously, a brake shortens the action time of the respective drive. The transmitter is preferably used to verify the motion of the drive. Both the brake and the transmitter may be connected to the motion controller.

A safety level can be understood to mean that a drive comes to a standstill from its respective speed of movement in a prescribed time (action time). The higher the safety level, the shorter the prescribed action time before the drive comes to a standstill. To increase the safety level, it is moreover possible for a mechanical and/or electronic brake to be used.

Depending on the use of the drive, a determined safety level may be prescribed in accordance with statutory provisions. By way of example, in areas of an industrial installation in which people are busy, the safety level is particularly high.

In this case, failsafety can mean that:

failure of individual components is prevented by a redundant design of critical components such as the motion controller, or a processor, a stipulated maximum slowing time (action time) may be prescribed for the respective drive, a failsafe data connection is configured to safely transmit data and/or signals from one component to a further component, and/or further components, such as a brake or an additional transmitter, prevent a malfunction of the respective drive.

A failsafe automation system is understood to mean an automation system that has one or more of the aforementioned features of failsafety.

A failsafe automation system or a failsafe drive system may respectively also be distinguished by a maximum speed for the respective drive.

A failsafe automation system may additionally or alternatively be distinguished by a stipulated reaction in the event of an (arriving) signal. As such, by way of example, it may be stipulated that opening a cover is possible only after a stipulated period of time when there is a signal.

In this case, a safety level is understood to mean that the respective drive that is associated with the safety level has an associated period of time, particularly a (re)action time. The stipulated period of time is the period of time during which the drive comes to a standstill at the latest. The stipulated period of time may also be the period of time after which the respective drive produces no further torque. In this case, the stipulated period of time is also referred to as the action time.

A failsafe processor can be understood to mean a module that supports or guarantees secure transmission of data between the motion controller and the respective drive. Therefore, a failsafe processor is preferably also configured as a communication module. By way of example, a failsafe processor is a failsafe proxy block. Failsafe also means that it is possible for failsafe interaction between multiple blocks to occur in an otherwise non-failsafe environment.

Preferably, the space in which the drives are located is divided into a plurality of areas. Advantageously, the areas are physically adjacent and optionally substantially contiguous. A space is particularly an area of a production hall. The space has, by way of example, a first area, a second area and a third area. The first area can have the actual installation or production machine, particularly a press. The first area has an assigned first, such as low, safety level.

Extending around the installation there is, by way of example, the second area. The second area advantageously contains apparatuses for equipping the installation. Here, there may possibly be a need for activities that are required to be performed manually. Therefore, protection of people in the second area may necessitate a higher safety level. Finally, the second area can adjoin the third area. The third area may be distinguished by regular activities that are required to be performed manually. Therefore, a high safety level is necessary in this third area.

In this example, the space is split into the three areas, where each respective area has an associated separate safety level. The areas are respectively arranged adjacently in the space, i.e., the two areas respectively have a common boundary or they are at least situated close to one another.

The areas may also be separated by physical boundaries, such as access locks, room dividers, corridors or (light) curtains.

The division of the space, such as a production hall, into areas having a respective safety level allows the respective drive situated in the respective area to be allocated a safety level. The allocation can, in this case, occur independently of the connection of the respective drive to the motion controller. The assignment of an area or a safety level allows an installation to be configured more easily.

Hence, the aforementioned object is achieved by virtue of the design being able to be designed flexibly by virtue of the association of the respective drive with the area or with a safety level.

In the case of one advantageous embodiment of the failsafe automation system, a respective area has an associated failsafe processor. Here, the failsafe processor advantageously monitors the operation of the respective drive in the associated area. Advantageously, the failsafe processor is moreover connected to the motion controller.

The failsafe processor also advantageously ensures the data interchange and/or the signal interchange between the motion controller and the applicable drive.

The respective failsafe processor is advantageously associated with the respective applicable area. As such, a failsafe processor may be connected to the motion controller for a respective area and/or for a respective safety level.

In one advantageous embodiment of the failsafe automation system, a respective area has an associated failsafe processor.

The association of a respective separate failsafe processor with an area allows the respective failsafe processor to be adapted in accordance with the safety level of the respective area. As such, it is possible, by way of example, for adapted failsafe processors to be used for different safety levels. An area having a safety level with low requirements may therefore be associated with a failsafe processor. An area having a high safety level may, in accordance with the requirements, be associated with a particularly powerful failsafe processor.

In summary, the respective safety level may thus be guaranteed by a respective adapted failsafe processor.

Advantageously, an area can also be allocated multiple failsafe processors.

The allocation of (at least) a respective failsafe processor to a respective area allows the failsafety of the automation system to be increased.

In a further advantageous embodiment of the failsafe automation system, the respective drive and/or the respective failsafe processor are connected via a failsafe data connection.

A failsafe data connection is understood to mean a data connection for which there is the assurance that the correct signals or the correct data arrive at the envisaged time, with the envisaged signal strength. Further, it is possible, particularly through a redundant embodiment, for the transmission of the correct data to be checked. A failsafe transmission may, by way of example, be formed by a redundant transmission with a subsequent comparison.

An example of a failsafe data connection is PROFIBUS or PROFINET from the Siemens AG company. Another failsafe data connection is provided, by way of example, via PROFIsafe addressing.

The safe transmission of data and/or signals means that the connection of the individual components advantageously also meets the chosen safety standard. In addition, errors in the transmission of signals or data are spotted.

In a further embodiment of the failsafe automation system, the respective safety level has an assigned action time, where the action time is a period of time from a trigger signal to the action of the respective drive.

An action time is, by way of example, the period of time that a switch needs to change a switching state. The monitoring time can also comprise multiple switching times and/or braking times. The presently contemplated embodiment allows compliance with the safety-relevant standards to be guaranteed easily and in a manner free of sources of error.

In a further advantageous embodiment, the respective failsafe processor comprises a failsafe IO controller (input/output controller).

The failsafe processor is used particularly to avoid errors during the transmission of data and/or signals. A failsafe processor therefore advantageously comprises an IO controller (input/output controller), particularly for what is known as I-device device communication, by way of example, for a further processor or a further component. Hence, it is possible for a non-failsafe component to become a failsafe component.

The failsafe processor may also be in the form of what is known as an I-slave, particularly for what is known as I-slave communication for a processor, particularly a non-failsafe processor, or a corresponding component. A non-failsafe processor is also referred to as a standard processor. The latter embodiment can also be combined with failsafe components, particularly further failsafe processors.

Additionally, the failsafe processor may also be provided for data transmission and/or signal transmission from and to a (further) failsafe processor. This is also referred to as an I-slave for direct data interchange and/or signal interchange.

The failsafe processor may also be provided as an IO controller having a (further) failsafe processor, particularly for failsafe transmission of signals and/or data. This is also referred to as shared device functionality.

The above-listed options can also be used in combination.

The use of a failsafe processor as a failsafe IO controller allows a non-failsafe automation system to be upgraded, at least on an area by area basis, to produce a failsafe automation system.

In a further advantageous embodiment of the failsafe automation system, the failsafe processors are respectively interconnected by a data connection.

Advantageously, the failsafe processors are also interconnected. Preferably, the failsafe processors are connected using a failsafe data connection.

The connection of the failsafe processors allows compliance with the applicable safety standard, by way of example, by virtue of communication being diverted or the machine being powered down in a controlled manner.

Failsafe processors are preferably in the form of software modules. The failsafe processors are then connected by a data interchange of the software modules.

The interconnection of the failsafe processors is preferably used for redundancy when there are multiple failsafe processors. As such, a failsafe processor in slave mode can forward data and/or signals to a failsafe processor in master mode. In a redundant configuration, particularly the (direct) connection of the failsafe processors is used for fast interchange of data.

In a further advantageous embodiment of the failsafe automation system, the drives and/or the failsafe processors are respectively associated with a zone. Advantageously, the zone is in the form of a respective plane in a network or another connection scheme of the data connection. Different zones can respectively have different safety levels.

A zone can be understood to mean a failsafe zone. As such, drives for which there are no particular safety demands can be allocated to a first zone. The first zone can therefore be distinguished by a low safety level to no safety level. In the first zone, there is thus only a single associated failsafe processor. If need be, there may also be no need at all for a failsafe processor.

A network is understood, in this case, to mean the connection scheme of the individual components of the automation system.

In addition, a network may also have a second and/or a third zone with higher safety standards. The increased safety need necessitates a higher level of failsafety. An improved failsafe transmission of data and/or signals in the zones of the network, which ensures failsafe communication in the network, can be guaranteed by further failsafe processors that are associated with the respective zone of the network.

The association of zones in a network of an automation network particularly allows the data transmission and/or signal transmission to be adapted to suit the requirements of failsafety for the individual drive.

In a further embodiment of the failsafe automation system, the respective failsafe processor, the respective motion controller and/or the respective drive are in redundant form.

A redundant form of a component, such as a motion controller, a (failsafe) processor or a (failsafe) data connection, means that the failsafe automation system has the respective component repeatedly. As such, two components, such as two failsafe processors, can interact with one another such that in a normal mode the first component forms a master and performs applicable functions and the second component forms a slave and performs applicable functions. If a malfunction is detected for the first failsafe processor, then the second failsafe processor (previously in the slave function) replaces the first failsafe processor. The second failsafe processor can continue in the master function, while the first failsafe processor is transferred to a slave function. In the event of a malfunction in the master, the master/slave division is thus changed.

In a redundant embodiment of a data transmission by a failsafe data connection, the data and/or the signals are routed via the at least two data connections. Advantageously, the transmitted data or signals are collated.

Advantageously, the data connection is used to perform a data comparison or a signal comparison between the individual components of the automation system.

In a further advantageous embodiment of the failsafe automation system, the failsafe automation system additionally includes an input system, where the input system is provided for the purpose of providing signals for the failsafe automation system, and where the input system is configured to assign the respective safety level for the respective drive.

The input system is advantageously configured analogously to an engineering system. The input system is preferably used for interaction with the user, where the user is able to stipulate motion sequences for the individual drives. In the advantageous embodiment, the user can also allocate the safety level, the respective failsafe processor and/or the respective monitoring time to the respective drive or to another component.

The input advantageously occurs using an input means. The input system may, in one advantageous embodiment, be integrated in a control program or interact with the control program for data engineering purposes.

Advantageously, the input system is formed as a computer program or is formed as a computer program package. The input system can therefore be installed on a computation unit and executed on the computation unit. To this end, the input system is transferred to the main memory and executed using a processor of the computation unit. The input system and/or the control program are advantageously used to provide data to the motion controller and/or to the (failsafe) processors or drives.

The input system is advantageously also suitable for indicating the zones of the network that contain the failsafe processor, the respective drive and/or the respective motion controller.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described and explained in more detail below based on figures. In this regard, the figures depict schematic or advantageous embodiments of the invention. It goes without saying that individual features of the individual embodiments can be combined to form new embodiments without departing from the scope of the invention presented here, in which.

DETAILED DESCRIPTION OF THE EXEMPLARY EMBODIMENTS

Figure 1:
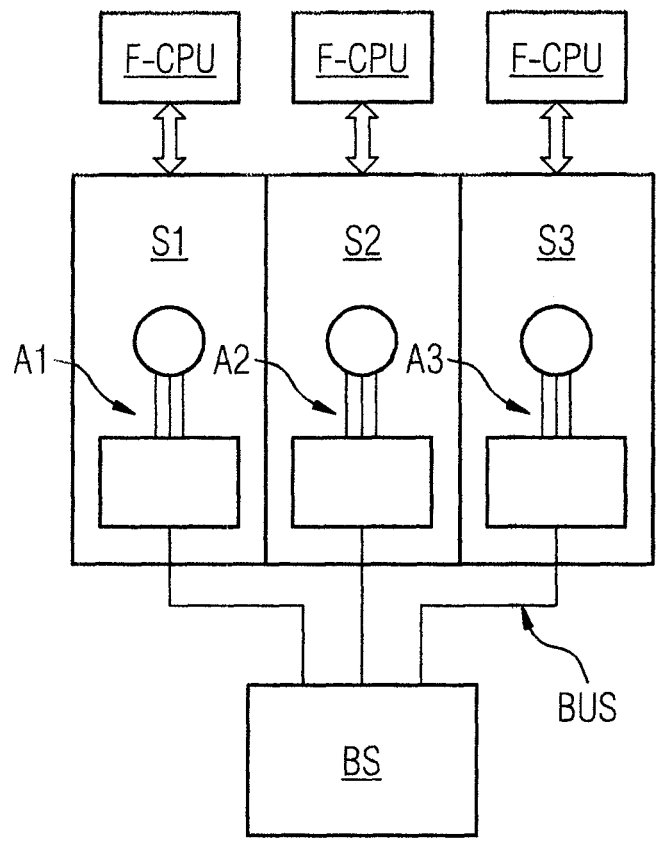
FIG. 1 shows a failsafe automation system in accordance with the invention.

FIG. 1 shows a failsafe automation system in accordance with the invention. The failsafe automation system includes a motion controller BS, where the motion controller BS is connected to drives A1, A2, A3. The motion controller BS is connected to the respective drive A1, A2, A3 by means of a data connection BUS, where the data connection BUS advantageously comprises a failsafe data connection BUS. The drives A1, A2, A3 are respectively associated with an area S1, S2, S3. Here, a first drive A1 is associated with a first area S1. In addition, a second drive A2 is associated with a second area S2 and a third drive A3 is associated with a third area S3. The respective area S1, S2, S3 is respectively associated with a failsafe processor F-CPU. The failsafe processor F-CPU is used to monitor the respective area S1, S2, S3. The failsafe processors F-CPU may also be integrated in the motion controller BS and/or in the respective drive A1, A2, A3.

Figure 2:
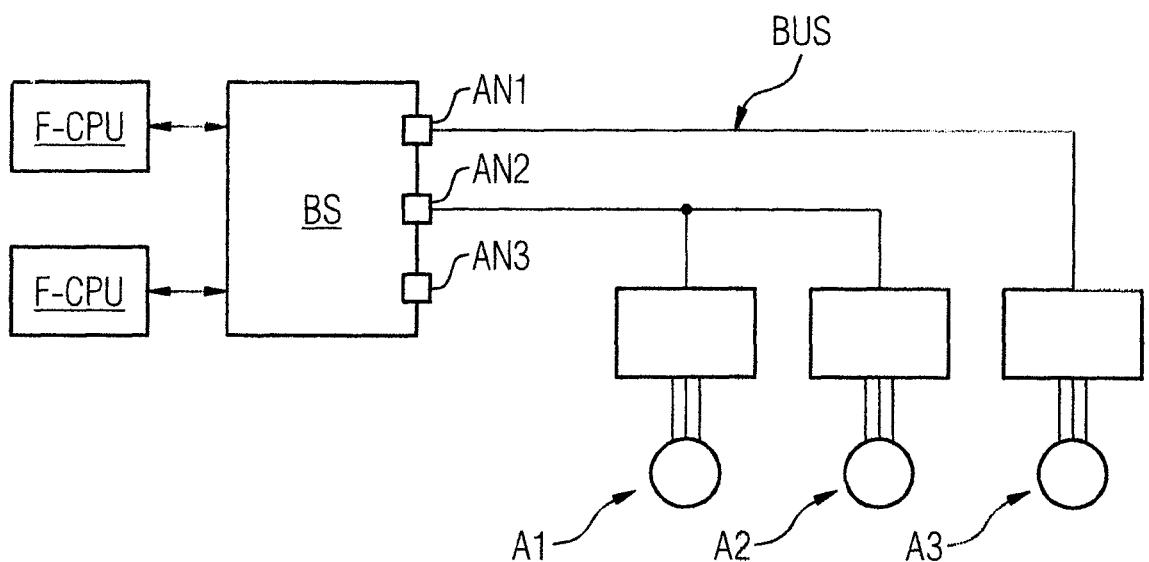
FIG. 2 shows a further failsafe automation system in accordance with the invention.

FIG. 2 shows a further failsafe automation system in accordance with the invention. In the case of the failsafe automation system shown here, the motion controller BS is respectively connected to a drive A1, A2, A3 via a connection An1, An2, An3. For the purpose of connecting the motion controller BS to the respective drive A1, A2, A3, the data connection BUS is used, advantageously configured as a failsafe data connection BUS. Additionally, failsafe processors F-CPU are connected to the motion controller BS. The failsafe processors F-CPU and the motion controller BS are advantageously likewise connected using a data connection BUS, where the data connection BUS particularly comprises an (industrial) Ethernet. The failsafe processors F-CPU may be provided for the purpose of providing failsafety for the respective connection An1, An2, An3 of the motion controller BS.

Figure 3:
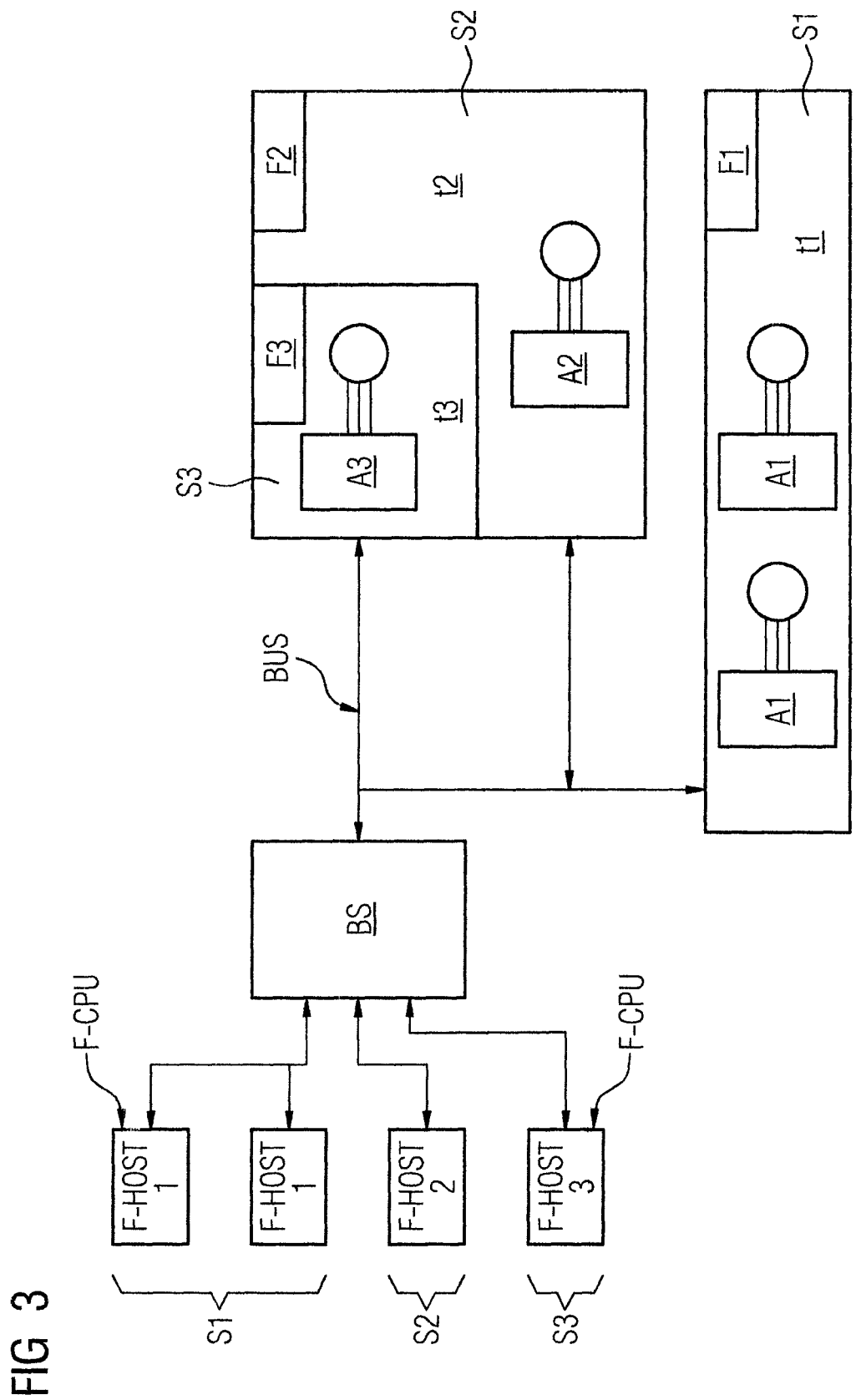
FIG. 3 shows a further failsafe automation system in accordance with the invention.

FIG. 3 shows a further failsafe automation system in accordance with the invention. In the case of the failsafe automation system shown here, a motion controller BS is configured to control drives A1, A2, A3. For the purpose of connecting the motion controller BS to the drives A1, A2, A3, a data connection BUS is used, where the data connection BUS advantageously comprises a failsafe data connection BUS. The drives A1, A2, A3 are arranged in areas S1, S2, S3 of a space, particularly of a production hall or of an installation. The individual drives respectively comprise a motor M.

In this arrangement, the respective area S1, S2, S3 includes an associated safety level F1, F2, F3. The individual areas are optionally separated from one another (not shown) by boundaries such as light barriers, access doors, in conjunction with partitions. The safety level F1, F2, F3 (in this case) indicates the level of failsafety with which the respective drive A1, A2, A3 needs to be configured or needs to operate. The failsafety of the individual drive A1, A2, A3 and/or the respective area S1, S2, S3 is indicated by an action time t1, t2, t3. The action time t1, t2, t3 is (in this case) used to stipulate how quickly a drive A1, A2, A3 needs to be slowed down to a standstill or to a rated speed. In the presently depicted example, two first drives A1 are associated with a first area S1, where the first area S1 is associated with a first safety level F1. In this example, the first area S1 is configured to have the highest safety level F1. The motion controller BS is further used to drive a second drive A2, where the second drive A2 is associated with a second area S2 and is located in this area. The second area S2 has an associated second safety level F2. The safety level F2 is (in this case) lower than the first safety level F1. Hence, the second monitoring time t2 is also advantageously configured to be longer than the first monitoring time t1. The motion controller BS is further used to drive a third drive A3, where the third drive A3 is associated with a third area S3. The third area S3 is associated with a third safety level F3.

The third area S3 is characterized by a third action time t3, the action time t3 being able to be configured to be longer than the second monitoring time t2 and even longer than the first monitoring time t1. The safety level F1, F2, F3 is (in this case) oriented to the monitoring time t1, t2, t3, where a short monitoring time t1, t2, t3 characterizes a high safety level F1, F2, F3. To monitor failsafety in the individual areas S1, S2, S3, failsafe processors F-CPU are associated with the respective safety levels F1, F2, F3 and the individual areas S1, S2, S3. Here, the failsafe processors F-CPU advantageously comprise failsafe HOST modules. The safety relevance of the first area S1 is highest in this case. The first failsafe processor F-CPU is formed redundantly. The failsafe processors F-CPU comprise failsafe host modules F-HOST. The numbering 1, 2 and 3 among the applicable reference symbols (F-HOST) merely indicates that the redundantly formed failsafe processor may be the same host model. The other two host models may be configured differently.

Figure 4:
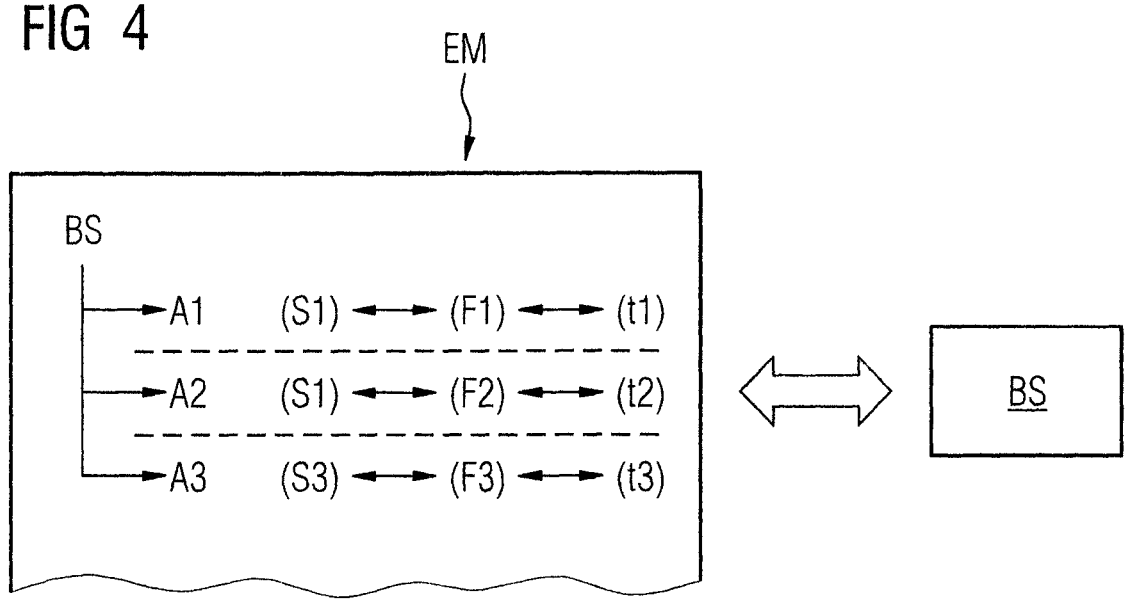
FIG. 4 shows an input system in accordance with the invention.

FIG. 4 shows an input system in accordance with the invention. The input system has an input mask EM, where the input mask EM lists the individual drives A1, A2, A3 and schematically depicts their respective connection to the motion controller BS. As a parameter, the input mask has the respective safety level F1, F2 for the respective drive A1, A2, A3. The respective area S1, S2, S3 can further be allocated a respective safety level F1, F2. The respective drive A1, A2, A3 can likewise be allocated a respective action time t1, t2, t3. The input mask is used for inputting the safety levels F1, F2 and the areas S1, S3 for the individual drives A1, A2, A3. The data that are input are transferred from the input system to the motion controller BS, where the motion controller BS is also advantageously able to use the relationships input in the input mask to take action in a checking capacity. The allocation of the first drive A1 and the second drive A2 to the safety level S1 and the allocation of the safety levels F1 and F2 to the area S1 are meant to indicate that it is also possible for multiple parameters to be allocated to one another.

Figure 5:
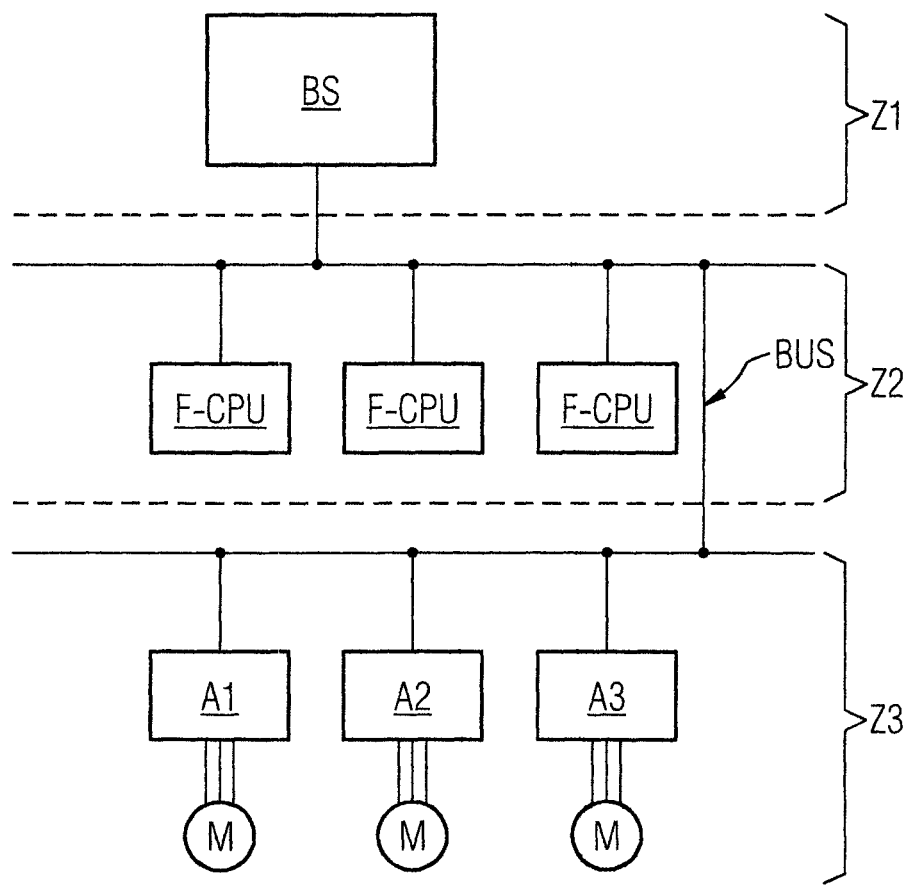
FIG. 5 shows zones of a network of a failsafe automation system in accordance with the invention.

FIG. 5 shows zones Z1, Z2, Z3 of a network of a failsafe automation system in accordance with the invention. Here, the zones Z1, Z2, Z3 comprise network planes, where a first network plane comprises the motion controller, the second network environment or the second zone Z2 includes at least one failsafe processor and a third zone or a third network plane includes the respective drives A1, A2, A3. For the purpose of connecting the individual planes, a data connection BUS is advantageously used. Individual zones Z1, Z2, Z3 may also be distinguished and/or connected by failsafe data connections BUS.

In summary, one aspect of the invention relates to a failsafe automation system. A further aspect of the invention relates to an input system. In the case of the failsafe automation system, a motion controller BS is connected to multiple failsafe processors F-CPU. The failsafe processors F-CPU are respectively associated with a safety level S1, S2, S3. The motion controller BS has at least one associated drive A1, A2, A3, where the respective drive A1, A2, A3 is respectively associated with areas S1, S2, S3 and the respective area S1, S2, S3 has an associated safety level F1, F2, F3. The safety level F1, F2, F3 indicates the level of (fail)safety with which the respective area S1, S2, S3 needs to be configured. The failsafe automation system allows individual areas S1, S2, S3 in spaces such as production halls to be easily equipped with the necessary (fail)safety.

The invention is not limited by the embodiments described above which are presented as examples only but can be modified in various ways within the scope of protection defined by the appended patent claims.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A failsafe automation system, comprising:
    a motion controller for at least one of (i) controlling and (ii) regulating a plurality of drives, each of said plurality of drives being respectively associated with a respective area of a plurality of areas; and
    a number of failsafe processors equal to a number of areas, said number of failsafe processors being interconnected with each other via a failsafe data connection, each processor of the interconnected number of processors being respectively associated with the respective area of the plurality of areas, a first and a second failsafe processor of said number of failsafe processors operating in a master/slave relationship to provide redundancy;
    wherein each respective area of the plurality of areas includes a respective assigned safety level including an assigned monitoring time comprising a period of time at which a trigger signal occurs to a moment in time at which an action of a respective drive of the plurality of drives occurs; and
    wherein the respective areas of the plurality of areas are arranged physically adjacently to one another and are assigned to a respective processor of said number of processors.

2. The failsafe automation system as claimed in claim 1, wherein at least one of (i) a respective drive of the plurality of drives and (ii) a respective failsafe processor are connected via a failsafe data connection.

3. The failsafe automation system as claimed in claim 1, wherein the failsafe processor comprises one of (i) a failsafe IO controller and (ii) a DP-I slave.

4. The failsafe automation system as claimed in claim 1, wherein at least one of (i) each drive of the plurality of drives and (ii) the failsafe processors are respectively associated with a zone.

5. The failsafe automation system as claimed in claim 1, wherein at least one of (i) the failsafe processor, (ii) the motion controller and (iii) each drive of the plurality of drives are in a redundant form.

6. The failsafe automation system as claimed in claim 1, further comprising:
    an input system for providing signals for the failsafe automation system;
    wherein the input system is configured to assign the respective assigned safety level for a respective drive of the plurality of drives.

7. An input system for a failsafe automation system as claimed in claim 1, wherein an input mask is utilizable to assign at least one of (i) a safety level, (ii) the failsafe processor and (iii) a monitoring time to at least one drive of the plurality of drives.

8. An installation having the failsafe automation system as claimed in claim 1.

9. An installation having the input system as claimed in claim 7.

10. The installation as claimed in claim 8, wherein the installation comprises one of (i) a production machine, (ii) a machine tool and (iii) an industrial installation.

11. The installation as claimed in claim 9, wherein the installation comprises one of (i) a production machine, (ii) a machine tool and (iii) an industrial installation.

* * * * *